(12) United States Patent
Peng et al.

(10) Patent No.: US 11,336,173 B1
(45) Date of Patent: May 17, 2022

(54) POWER CONVERTER DEVICE AND DRIVING METHOD

(71) Applicant: Chicony Power Technology Co., Ltd., New Taipei (TW)

(72) Inventors: Tso-Jen Peng, New Taipei (TW); Mao-Song Pan, New Taipei (TW); Yi-Ching Su, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 0 days.

(21) Appl. No.: 17/195,531

(22) Filed: Mar. 8, 2021

(30) Foreign Application Priority Data

Jan. 27, 2021 (TW) .................................. 110103090

(51) Int. Cl.
  *H02M 1/42* (2007.01)
  *H02M 1/00* (2006.01)
  *H02M 3/335* (2006.01)

(52) U.S. Cl.
  CPC ......... *H02M 1/4241* (2013.01); *H02M 1/425* (2013.01); *H02M 3/335* (2013.01); *H02M 1/0085* (2021.05); *H02M 1/4225* (2013.01); *H02M 1/4283* (2021.05)

(58) Field of Classification Search
  CPC . H02M 1/0085; H02M 1/4225; H02M 1/4241
  See application file for complete search history.

(56) References Cited

U.S. PATENT DOCUMENTS

| | | | |
|---|---|---|---|
| 7,765,816 B2 | 8/2010 | Okaza et al. | |
| 8,091,375 B2 | 1/2012 | Crawford | |
| 9,190,898 B2 * | 11/2015 | Brinlee | H02M 3/33569 |
| 10,250,126 B1 * | 4/2019 | Chen | H02M 3/33569 |
| 10,534,029 B1 * | 1/2020 | Tsai | H02M 3/33569 |
| 2006/0193158 A1 * | 8/2006 | Fukaya | H02J 3/40 363/132 |
| 2010/0170292 A1 | 7/2010 | Narikawa et al. | |
| 2010/0217441 A1 | 8/2010 | Eichman | |
| 2011/0056384 A1 | 3/2011 | Kadota | |

(Continued)

FOREIGN PATENT DOCUMENTS

| | | |
|---|---|---|
| CN | 102207322 B | 8/2014 |
| TW | 201041287 A | 11/2010 |

(Continued)

*Primary Examiner* — Gary A Nash
(74) *Attorney, Agent, or Firm* — CKC & Partners Co., LLC

(57) ABSTRACT

The present disclosure relates to a power converter device including a power factor correction circuit, a resonance converter circuit, and a zero voltage switching circuit. The power factor correction circuit is coupled to the primary side rectifier circuit, and includes a first switching circuit, a first control circuit and a first output circuit. The resonance converter circuit includes a second switching circuit and a second control circuit. The second switching circuit is coupled to the first output circuit, and the second control circuit is coupled to the secondary side rectifier circuit. The zero voltage switching circuit is coupled between the first control circuit and the second control circuit. The zero voltage switching circuit is configured to obtain a switching voltage of a switch element in the second switching circuit, and output an adjustment signal to the first control circuit according to the switching voltage.

17 Claims, 6 Drawing Sheets

(56) References Cited

U.S. PATENT DOCUMENTS

| | | |
|---|---|---|
| 2012/0025720 A1 | 2/2012 | Chen et al. |
| 2012/0281434 A1* | 11/2012 | Lin .................... H02M 3/3376 363/21.02 |
| 2014/0097821 A1* | 4/2014 | Chen ................... H02M 1/4225 323/293 |
| 2016/0141964 A1* | 5/2016 | Yu ..................... H02M 3/33507 363/21.02 |
| 2016/0211759 A1* | 7/2016 | Luccato ................ H05B 45/39 |

FOREIGN PATENT DOCUMENTS

| | | | |
|---|---|---|---|
| TW | 201424240 A | 6/2014 | |
| TW | 201444262 A | 11/2014 | |
| TW | I467121 B | 1/2015 | |
| TW | I516886 B | 1/2016 | |
| TW | 201610371 A | 3/2016 | |
| TW | I670919 B | 9/2019 | |

\* cited by examiner

POWER CONVERTER DEVICE AND DRIVING METHOD

CROSS-REFERENCE TO RELATED APPLICATION

This application claims priority to Taiwan Application Serial Number 110103090, filed Jan. 27, 2021, which is herein incorporated by reference in its entirety.

BACKGROUND

Technical Field

The embodiments of the present disclosure relate to a circuit technology, and particularly relates to a power converter device.

Description of Related Art

With the development of circuit technology, power conversion devices are applied to many devices. Power conversion device in the prior art has negative factors such as switching loss, iron loss, conduction loss, and negative current. Accordingly, improving the efficiency of power conversion devices is one of the important issues in the field.

SUMMARY

One aspect of the present disclosure is a power converter device, comprising a power factor correction circuit, a resonance converter circuit and a zero voltage switching circuit. The power factor correction circuit is electrically coupled to a primary side rectifier circuit. The power factor correction circuit comprises a first switching circuit, a first control circuit and a first output circuit. The resonance converter circuit is electrically coupled to the power factor correction circuit, and comprises a second switching circuit and a second control circuit. The second switching circuit is electrically coupled to the first output circuit, and the second control circuit is electrically coupled to a secondary side rectifier circuit. The zero voltage switching circuit is electrically coupled between the first output circuit and the second control circuit. The zero voltage switching circuit is configured to obtain a switching voltage in the second switching circuit, and is configured to output an adjustment signal to the first control circuit according to the switching voltage.

Another aspect of the present disclosure is a driving method, comprising the following steps: driving a power factor correction circuit to output an output voltage to a resonance converter circuit; detecting, by a zero voltage switching circuit, a reference voltage and a switching voltage of the resonance converter circuit, wherein the resonance converter circuit at least comprises a switching switch, a switching capacitor and a resonance circuit, and the switching voltage corresponds to a terminal voltage of the switching switch; comparing, by the zero voltage switching circuit, the reference voltage and the switching voltage; outputting, by the zero voltage switching circuit, an adjustment signal to the power factor correction circuit, wherein the signal level of the adjustment signal is determined by a comparison result of the switch voltage and the reference voltage; and selectively increasing or maintaining, by the power factor correction circuit, the output voltage according to the adjustment signal.

Another aspect of the present disclosure is a power converter device, comprising a power factor correction circuit, a resonance converter circuit and a zero voltage switching circuit. The power factor correction circuit is electrically coupled to a primary side rectifier circuit. The power factor correction circuit comprises a first switching circuit, a first control circuit and a first output circuit. The resonance converter circuit is electrically coupled to the power factor correction circuit, and comprises a second switching circuit and a second control circuit. The second switching circuit is electrically coupled to the first output circuit, and the second control circuit is electrically coupled to a secondary side rectifier circuit. The zero voltage switching circuit is electrically coupled between the first output circuit and the second control circuit. The zero voltage switching circuit is configured to detect a cross voltage between two terminals of a switching switch in the second switching circuit, and is configured to output an adjustment signal to the first control circuit according to the cross voltage.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
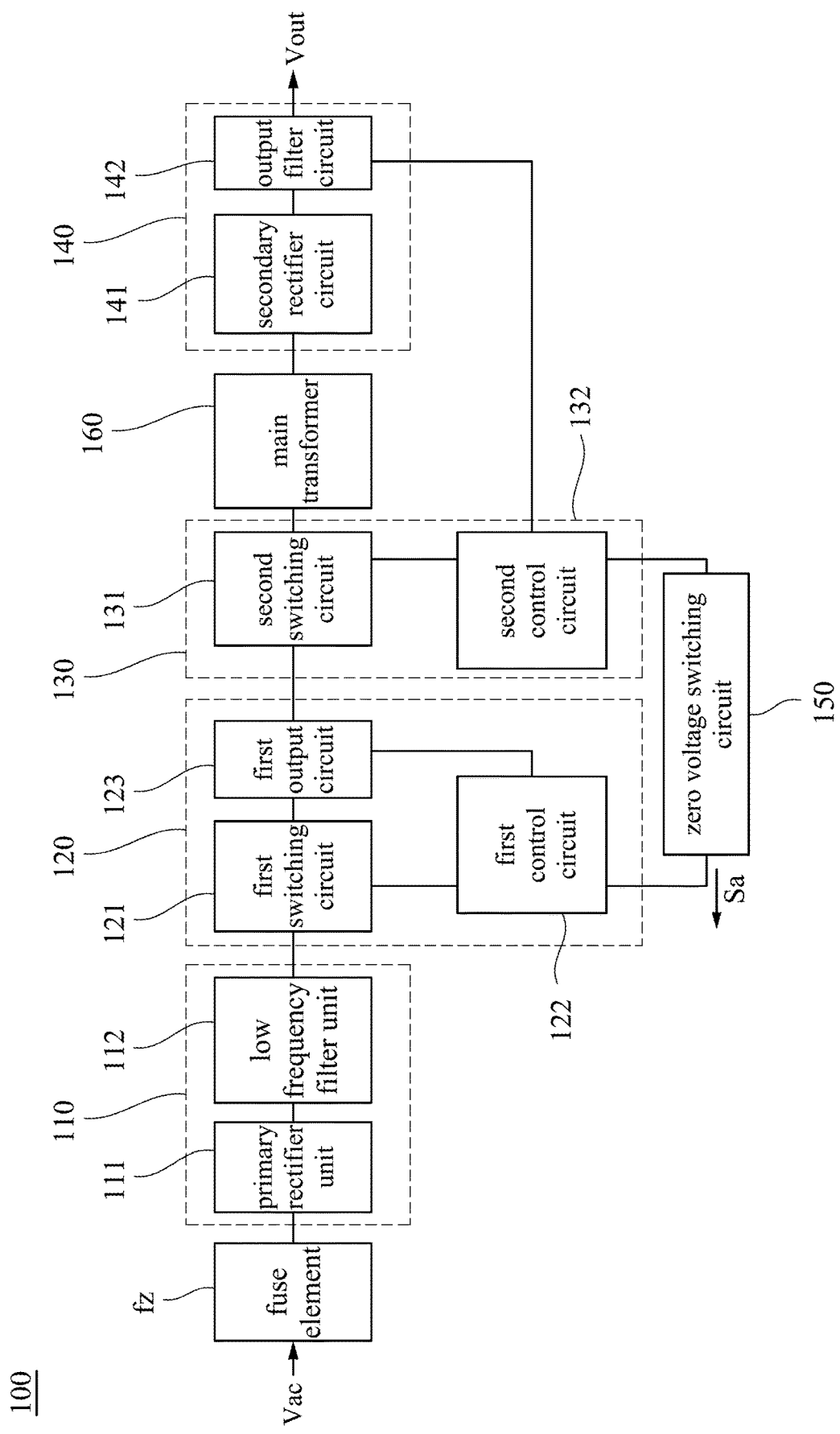
FIG. 1 is a schematic diagram of a power converter device in some embodiments of the present disclosure.

FIG. 1 is a schematic diagram of a power converter device in some embodiments of the present disclosure. The power converter device 100 is configured to receive a AC voltage signal Vac, and is configured to convert the AC voltage signal Vac to generate a DC voltage signal Vout to a load. In one embodiment, the power converter device 100 includes a primary side rectifier circuit 110, a power factor correction circuit 120 (Power Factor Correction Circuit), a resonance converter circuit 130, a secondary side rectifier circuit 140 and a zero voltage switching circuit 150.

The primary side rectifier circuit 110 includes a primary rectifier unit 111 and a low frequency filter unit 112. The primary rectifier unit 111 receives the AC voltage signal Vac through a fuse element fz. The power factor correction circuit 120 is electrically coupled to a primary side rectifier circuit 110, and is configured to receive the AC voltage signal Vac. The power factor correction circuit 120 adjusts the power factor of electric energy conversion through the internal switching circuit. In other words, the power factor correction circuit 120 is configured to reduce the phase difference between voltage and current to ensure power supply efficiency.

In one embodiment, the power factor correction circuit 120 includes a first switching circuit 121, a first control circuit 122 and a first output circuit 123. The first switching circuit 121 is configured to control the turned on or turned off of internal switching elements according to the frequency of a first control signal to adjust the output voltage. The first control circuit 122 is electrically coupled to the first switching circuit 121, and is configured to provide the first control signal to the first switching circuit 121. The first output circuit 123 is configured to receive an electric energy, which is generated by the first switching circuit 121 after converting the AC voltage Vac, so as to generate the output voltage Vb. The internal circuit of the power factor correction circuit 120 will be detailed in the following paragraphs.

The resonance converter circuit 130 is electrically coupled to an output terminal of the power factor correction circuit 120, and is configured to receive the output voltage Vb of the power factor correction circuit 120. The resonance converter circuit 130 further controls the output voltage Vb by controlling the frequency of internal switches, so as to generate a stable resonant switching voltage. In one embodiment, the resonance converter circuit 130 includes a second switching circuit 131 and a second control circuit 132. The second switching circuit 131 is electrically coupled to the first output circuit 123. The second control circuit 132 is electrically coupled to the second switching circuit 131, and provides a second control signal to the second switching circuit 131, so that the second switching circuit 131 may control internal switches according to the second control signal.

The secondary side rectifier circuit 140 is electrically coupled to the second control circuit 132 of the resonance converter circuit 130, and is configured to receive a resonance conversion electric energy output by the resonance converter circuit 130. The secondary side rectifier circuit 140 provides the resonance conversion electric energy to the load. In some embodiments, the secondary side rectifier circuit 140 includes a secondary rectifier circuit 141 and an output filter circuit 142. The output filter circuit 142 is electrically coupled to the second control circuit 132. Since those skilled in the art can understand the circuits and principles of rectification and filtering in power converters, the operation principles of the primary side rectifier circuit 110 and the secondary side rectifier circuit 140 are not further detailed herein.

The zero voltage switching circuit 150 is electrically coupled between the first control circuit 122 and the second control circuit 132, and is configured to obtain a switching voltage of the second switching circuit 131. The above "the switching voltage" may be a cross voltage of one of the switching switches of the second switching circuit 131 (e.g., the voltage value between two terminals of one switching switch), or a voltage value of one terminal of the switching switch. The zero voltage switching circuit 150 is configured to determine the present operation of the resonance converter circuit 130 according to the switching voltage. The zero voltage switching circuit 150 outputs an adjustment signal Sa to the first control circuit 122 according to the switching voltage, so that the first control circuit 122 changes the first control signal according to the adjustment signal Sa. The method for the zero voltage switching circuit 150 to obtain the switching voltage will be explained in the following paragraphs.

Accordingly, by detecting the switching voltage in the second switching circuit 131, the adjustment signal Sa will be generated and the first control signal output by the first control circuit 122 will be changed. The output voltage Vb of the power factor correction circuit 120 will be dynamically adjusted, and the resonance converter circuit 130 will not make the output voltage unstable due to the ripple of the output voltage Vb. Specifically, when the output voltage Vb of the power factor correction circuit 120 is stable, the effect of the parasitic capacitor of the resonance converter circuit 130 will be reduced, so that the resonance converter circuit 130 will operate in a preset state, such as performing zero voltage switching.

Figure 2:
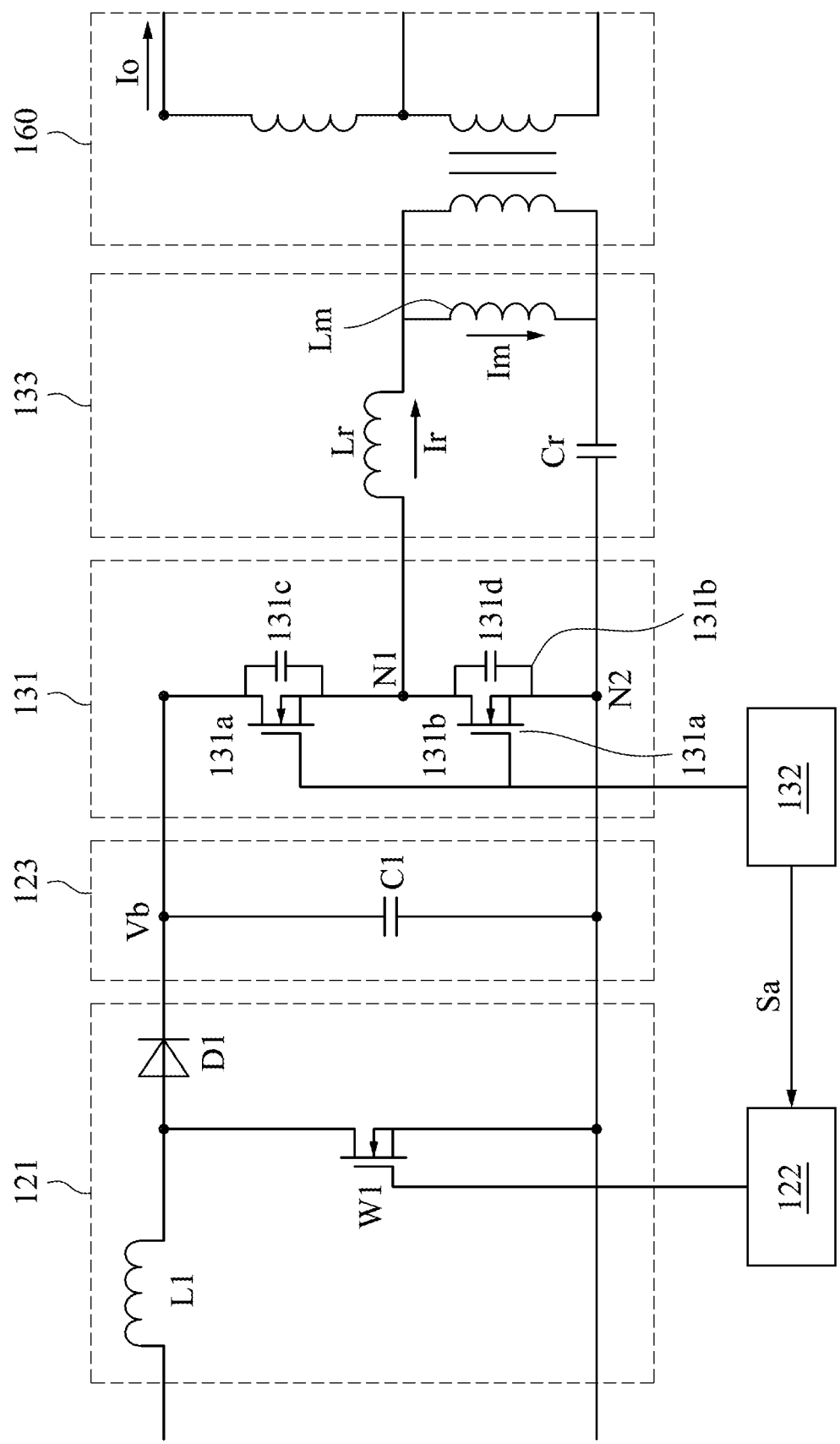
FIG. 2 is a schematic diagram of a power factor correction circuit and a resonance converter circuit in some embodiments of the present disclosure.

FIG. 2 is a schematic diagram of a power factor correction circuit 120 and a resonance converter circuit 130 in some embodiments of the present disclosure. In one embodiment, the first switching circuit 121 includes a first inductance L1, a first diode D1 and a first switch element W1. The first switch element W1 is turned on or off according to the first control signal provide by the first control circuit 122. In some embodiments, the first control signal includes a pulse width modulation signal. According to the change of the duty of the first control signal, the output voltage of the first switching circuit 121 will accordingly change. The first output circuit 123 includes a output capacitor C1, and is configured to restore the voltage output by the first switching circuit 121. The first output circuit 123 provide the output voltage Vb to the resonance converter circuit 130.

As shown in FIG. 2 the second switching circuit 131 at least includes the first switching switch 131a, a second switching switch 131b and the corresponding two switching capacitors 131c, 131d. The switching switch 131a, 131b is electrically coupled to the first output circuit 123 and the corresponding switching capacitors 131c, 131d. In one embodiment, the switching capacitor 131c, 131d are the parasitic capacitors of the switching switch 131a, 131b, respectively.

In one embodiment, the resonance converter circuit 130 further includes a resonance circuit 133 and main transformer 160. The resonance circuit 133 is electrically coupled between the second switching circuit 131 and the main transformer 160, and includes a resonance capacitor Cr, a resonance inductance Lr and an excitation inductance Lm. The first terminal of the main transformer 160 is electrically coupled to the resonance converter circuit 130. The second terminal of the main transformer 160 is electrically coupled to the secondary side rectifier circuit 140.

When the first switching switch 131a is turned on and the second switching switch 131b is turned off, the resonance capacitor Cr and the resonance inductance Lr form a resonant cavity. The input voltage of the resonance converter circuit 130 (i.e., the output voltage Vb of the power factor correction circuit 120) supplies power to the resonant cavity and the primary side of the main transformer 160. The output current Io is formed on the secondary side of the main transformer 160. At this time, the resonance capacitor Lr generates a resonance current Ir, and the excitation inductance Lm generates an excitation current Im.

When the first switching switch 131*a* is turned off and the second switching switch 131*b* is turned on, the resonance current Ir is equal to the excitation current Im, and the resonant cavity discharges in reverse. The output current Io of the secondary side of the main transformer 160 becomes zero. At the moment when the switching switch 131*a*, 131*b* changes from turn off to turn on, if the cross voltage of the switching switch 131*a*, 131*b* is zero, it is "zero voltage switching", which prevents excessive energy loss.

Specifically, the resonance converter circuit 130 operates with two resonance points (frequencies), the first resonance point is determined by "the resonance inductance Lr and the resonance capacitor Cr". The second resonance point is determined by "the excitation inductance Lm, the resonant capacitor Cr and the load conditions". When the frequency of the resonance converter circuit 130 is greater than the first resonance point, the resonance converter circuit 130 is in the first operating state, and is configured to perform "zero voltage switching." When the frequency of the resonance converter circuit 130 is between the first resonance point and the second resonance frequency, the resonance converter circuit 130 is in the second operating state, and is configured to perform "zero current switching." If the input voltage of the resonance converter circuit 130 (i.e., the output voltage Vb of the power factor correction circuit 120) is unstable due to ripples, the cross voltage of the switching switch 131*a*, 131*b* and the capacitance of the switching capacitor 131*c*, 131*d* change accordingly, resulting in incomplete discharge, and the resonance converter circuit 130 cannot be ideally controlled in the first operating state to perform zero voltage switching.

As mentioned above, in order to ensure that the resonance converter circuit 130 performs zero voltage switching when it is in the first operating state, before changing the operating state of the switching switch 131*a*, 131*b*, the resonance current Ir in the resonance circuit 133 will be controlled to be greater than the excitation current Im. The extra current in the resonance current Ir (i.e., Ir minus Im) can assist the parasitic capacitor of the resonance circuit 133 (e.g., the switching capacitors 131*c*, 131*d*) to be fully discharged. Accordingly, it will be ensured that the resonance converter circuit 130 is in the first operating state to perform zero voltage switching.

As described in the foregoing embodiment, the present disclosure detects the switching voltage of the resonance converter circuit 130 (e.g., the cross voltage of the switching switches 131*a*, 131*b*) to determine whether the output voltage of the power factor correction circuit 120 needs to be adjusted Vb. In one embodiment, the switching voltage can be the voltage value at one terminal of the first switching switch 131*a* or the second switching switch 131*b* (i.e., the node N1 shown in FIG. 2). If the switching voltage is greater than a reference value (e.g., reference voltage), it means that the parasitic capacitor has not been discharged. At this time, the zero voltage switching circuit 150 outputs the adjustment signal Sa to the first control circuit 122, so that the first control circuit 122 changes the first control signal (e.g., changes the duty cycle) according to the adjustment signal. Accordingly, the output voltage Vb of the power factor correction circuit 120 will be increased, and the resonance current Ir will also be increased to assist the parasitic capacitor discharge.

Figure 3:
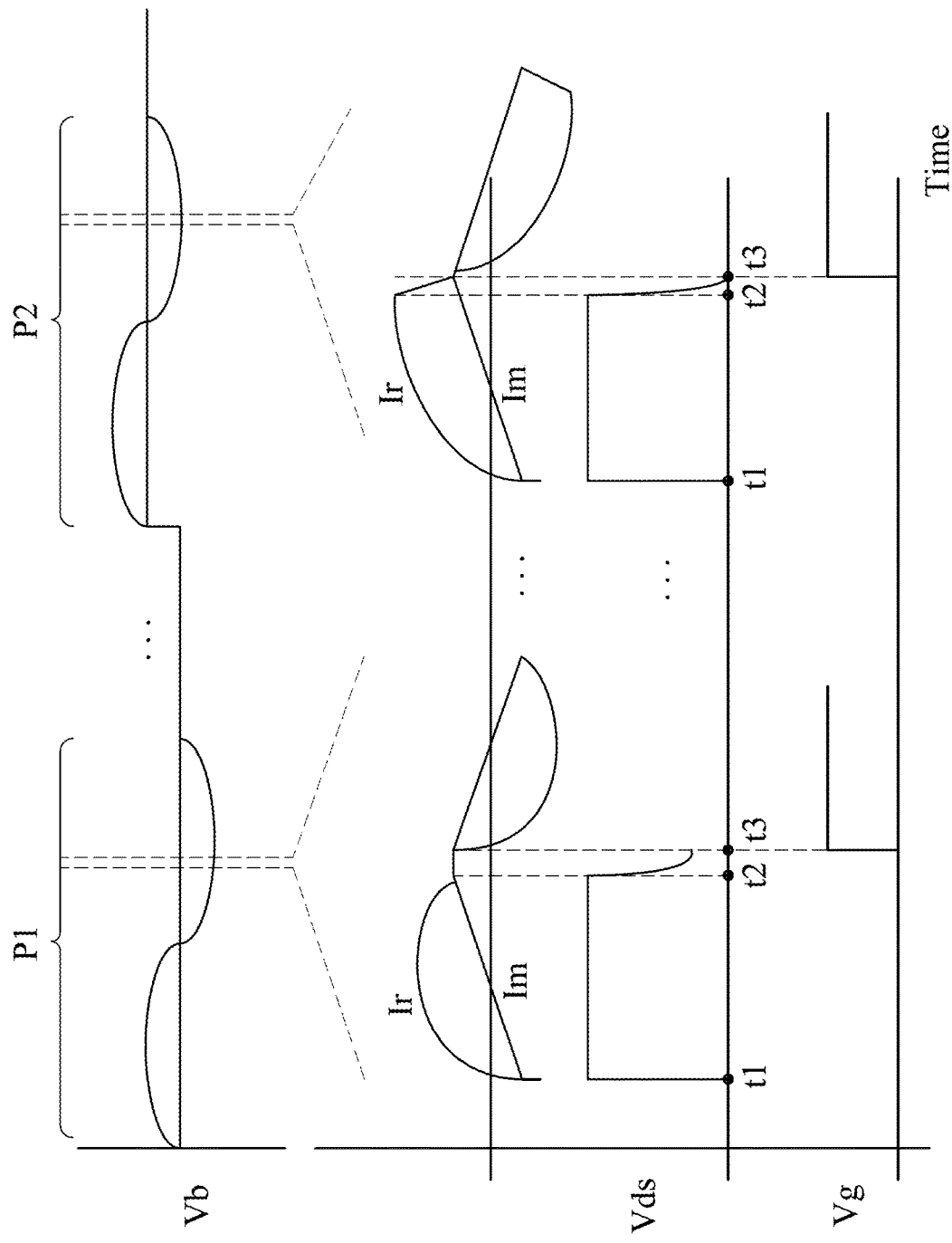
FIG. 3 is a waveform diagram of the power converter device in some embodiments of the present disclosure.
Figure 4:
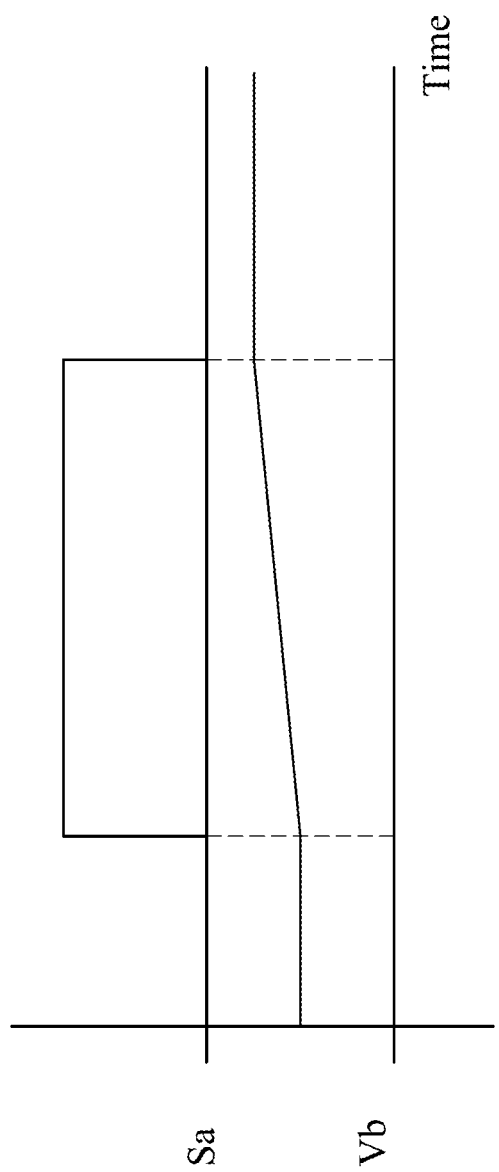
FIG. 4 is a waveform diagram of the adjustment signal and the output voltage in some embodiments of the present disclosure.

FIG. 3 is a waveform diagram of the power converter device in some embodiments of the present disclosure, wherein the cross voltage Vds is the voltage value between two terminals of the second switching switch 131*b* (or the voltage value of the node N1), and the gate voltage Vg is the voltage used to control the gate terminal of the second switching switch 131*b*. FIG. 4 is a waveform diagram of the adjustment signal Sa and the output voltage Vb in some embodiments of the present disclosure.

The present disclosure can periodically or repeatedly detect the switching voltage of the resonance converter circuit 130 to determine whether the output voltage Vb needs to be adjusted. FIG. 3 is an enlarged waveform diagram of the resonance current Ir, the excitation current Im, the cross-voltage Vds and the gate voltage Vg during the change time of the output voltage Vb, and includes a signal waveforms of the resonance converter circuit 130 under different driving methods.

During the driving period P1, the output voltage Vb is not dynamically adjusted. In the driving period P2, the zero voltage switching circuit 150 dynamically adjusts the output voltage Vb through the adjustment signal Sa.

As shown in the figure, during the driving period P1, when the first switching switch 131*a* is turned on (i.e., time t1-t2), the resonance current Ir generated by the resonance inductance Lr, the excitation current Im generated by the excitation inductance Lm, and the resonance current Ir is greater than the excitation current Im. At this time, the resonance circuit 133 supplies power to the primary side of the main transformer 160.

At the time t2 of the driving period P1, the excitation current Im rises to be equal to the resonance current Ir. At this time, the first switching switch 131*a* is turned off, and the second switching switch 131*b* has not been turned on. During the time t2-t3, the output voltage Vb may be reduced due to the effect of ripples, resulting in the parasitic capacitor of the first switching switch 131*a* (e.g., the switch 131*c*) cannot be completely discharged in a short time. When the output current becomes zero at the time t3, if the resonance converter circuit 130 turns on the second switching switch 131*b*, the second switching switch 131*b* will not be able to achieve zero voltage switching (cross voltage Vds is not zero).

On the other hand, in the time t1-t2 of the driving period P2, the resonance current Ir is greater than the excitation current Im. At this time, the resonance circuit 133 similarly supplies power to the primary side of the main transformer 160. When the output current Io is generated on the secondary side of the main transformer 160 (i.e., before the output current Io becomes zero, that is, time t1-t3), the zero voltage switching circuit 150 continuously detects the switching voltage (i.e., the voltage value of the node N1, or the cross voltage Vds).

As mentioned above, when the cross voltage Vds is greater than the reference value, it means that the parasitic capacitor (switch 131*c*) of the first switching switch 131*a* has not been discharged yet. As shown in FIG. 4, the zero voltage switching circuit 150 will generate the adjustment signal Sa (or change the signal level of the adjustment signal Sa) to the first control circuit 122, so that the power factor correction circuit 120 increases the output voltage Vb. Accordingly, the resonance current Ir will be increased, and is configured to increase the discharge speed of the switching capacitor 131c. When the second switching circuit 131 turns on the second switching switch 131b, the cross voltage Vds is zero (i.e., zero voltage switching). In other words, the adjustment signal Sa generated by the zero voltage switching circuit 150 can ensure that the resonance current Ir is greater than the excitation current Im before the second switching switch 131b is turned on, and the resonance current Ir is configured to increase the discharge speed of the switching capacitor 131d to perform zero voltage switching.

Figure 5:
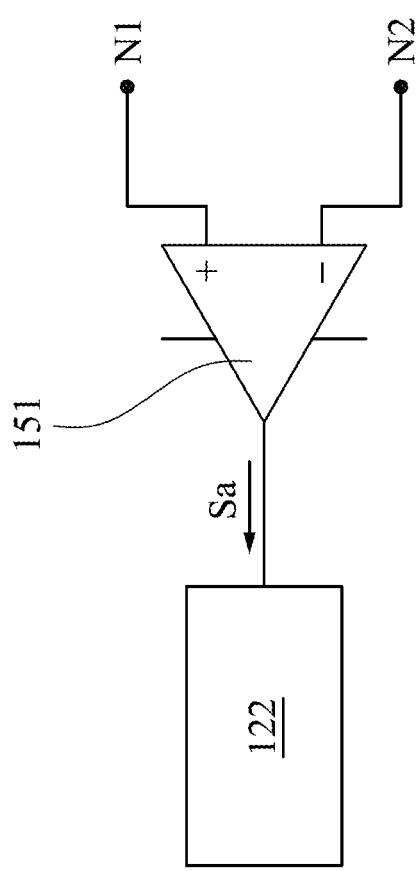
FIG. 5 is a schematic diagram of a comparison circuit in some embodiments of the present disclosure.

FIG. 5 is a schematic diagram of the zero voltage switching circuit 150 in some embodiments of the present disclosure. The two input terminals of the comparison circuit 151 are respectively configured to receive the switching voltage (e.g., the voltage of the first node N1) and the reference voltage (e.g., the voltage of the second node N2, or a reference potential). The comparison circuit 151 is configured to compare the voltage difference between the nodes N1 and N2. According to the comparison result, the comparison circuit 151 outputs the adjustment signal Sa to the first control circuit 122. The power factor correction circuit 120 selectively adjusts the output voltage Vb output to the resonance converter circuit 130 according to the signal level of the adjustment signal Sa.

As shown in FIG. 2 and FIG. 4, in one embodiment, when the switching voltage (the voltage of the first node N1) is greater than the reference voltage (the voltage of the second node N2), the adjustment signal Sa output by the comparison circuit 151 is at a high level, and the power factor correction circuit 120 will increase the output voltage Vb accordingly (e.g., increase the duty cycle of the first control signal). If the switching voltage (the voltage of the first node N1) is equal to or less than the reference voltage (the voltage of the second node N2), the adjustment signal Sa output by the comparison circuit 151 is at a low level, and the power factor correction circuit 120 will maintain the original output voltage Vb.

As shown in FIG. 2 and FIG. 3, when the first switching switch 131a is turned on, and the second switching switch 131b is turned off, the secondary side of the main transformer 160 generates the output current Io. During this period (i.e., time t1-t3), the zero voltage switching circuit 150 is configured to detect the switching voltage, and output the adjustment signal Sa to the first control circuit 122 according to the switching voltage. When the output current Io becomes zero (i.e., time t3), the resonance current Ir is greater than the excitation current Im to ensure that the second switching switch 131b can achieve zero voltage switching.

Figure 6:
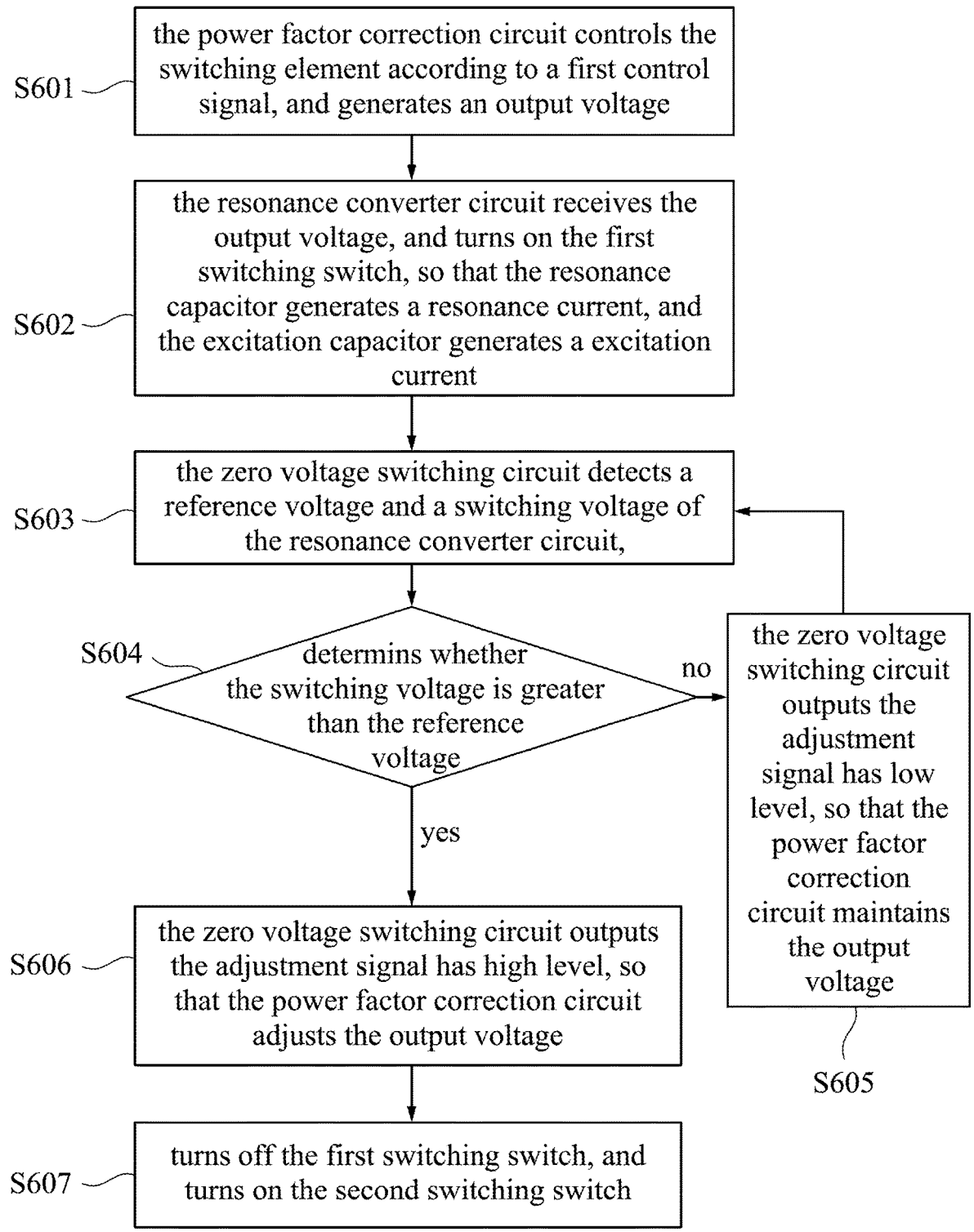
FIG. 6 is a flowchart illustrating a driving method in some embodiments of the present disclosure.

FIG. 6 is a flowchart illustrating a driving method in some embodiments of the present disclosure. In step S601, the power factor correction circuit 120 receives the voltage provided by the primary side rectifier circuit 110, and controls the first switch element W1 according to the first control signal, so as to generate the output voltage Vb.

In step S602, as shown in FIG. 3 at time t1-t2, the resonance converter circuit 130 receives the output voltage Vb, and turns on the first switching switch 131a. The resonance inductance generates the resonance current Ir, and the excitation inductance generates the excitation current Im. The resonance current Ir rises as a sine wave, and the excitation current Im rises linearly. At this time, the resonance circuit 133 supplies power to the main transformer 160.

In step S603, the zero voltage switching circuit 150 detects the switching voltage and the reference voltage in the resonance converter circuit 130. The switching voltage corresponds to any one terminal of the switching switches 131a, 131b. For example, detecting the voltage of the first node N1 or the second node N2.

In step S604, determining whether the switching voltage (or cross voltage) is greater than the reference value (e.g., reference voltage). When the switching voltage is less than or equal to the reference voltage, the discharge state of the switching capacitor 131c is normal. Therefore, in step S605, the zero voltage switching circuit 150 outputs the adjustment signal Sa with a low level, so that the power factor correction circuit 120 maintains the output voltage Vb according to the adjustment signal Sa. The signal level of the adjustment signal Sa is determined by the comparison result of the comparison circuit 151.

In step S606, when the switching voltage is greater than the reference voltage, it means that the switching capacitor 131c discharges incompletely. The zero voltage switching circuit 150 outputs the adjustment signal Sa with a high level, so that the power factor correction circuit 120 increases the output voltage Vb according to the adjustment signal Sa.

In step S607, when the output current Io becomes zero (time t3), the first switching switch 131a is turned off, and the second switching switch 131b is turned on. At this time, since the switching capacitor 131c of the first switching switch 131a has been fully discharged, zero voltage switching can be achieved. As mentioned above, the present disclosure can periodically or repeatedly detect the switching voltage of the resonance converter circuit 130, and adjust the output voltage Vb accordingly. In other words, the power converter device 100 can repeatedly perform steps S601-S607 to dynamically and continuously monitor to adjust the output voltage Vb.

As mentioned above, the present disclosure detects the voltage state of the resonance converter circuit 130, and determines whether the output voltage Vb provided by the power factor correction circuit 120 has an error due to unstable (e.g., ripple). At the same time, the power factor correction circuit 120 is adjusted in real time to ensure that the resonance converter circuit 130 operates in the first operating state, and the resonance current can assist the capacitor to discharge completely to achieve zero voltage switching.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A power converter device, comprising:
a power factor correction circuit electrically coupled to a primary side rectifier circuit, wherein the power factor correction circuit comprises a first switching circuit, a first control circuit and a first output circuit;
a resonance converter circuit electrically coupled to the power factor correction circuit, comprising a second switching circuit and a second control circuit, wherein the second switching circuit is electrically coupled to the first output circuit, and the second control circuit is electrically coupled to a secondary side rectifier circuit; and a zero voltage switching circuit electrically coupled between the first control circuit and the second control circuit, wherein the zero voltage switching circuit is configured to obtain a switching voltage in the second switching circuit, and is configured to output an adjustment signal to the first control circuit according to the switching voltage wherein the second switching circuit comprises:

a switching switch electrically coupled to the first output circuit; and a switching capacitor electrically coupled to the switching switch, wherein before the switching switch is turned on, a resonance current of the resonance converter circuit is configured to increase a discharge speed of the switching capacitor, and the second switching circuit performs a zero voltage switching;

wherein the resonance converter circuit further comprises:

a resonance circuit electrically coupled between the second switching circuit and a main transformer, and comprising a resonance inductance and an excitation inductance, wherein before the switching switch is turned on, the resonance current generated by the resonance inductance is greater than an excitation current generated by the excitation inductance to increase the discharge speed of the switching capacitor; and wherein when the main transformer generates an output current, the zero voltage switching circuit is configured to detect the switching voltage in the second switching circuit, and is configured to output the adjustment signal to the first control circuit according to the switching voltage, and the resonance current is greater than the excitation current generated by the excitation inductance when the output current becomes zero.

2. The power converter device of claim 1, wherein the zero voltage switching circuit further comprises:

a comparison circuit configured to receive a reference voltage and the switching voltage, and configured to compare the reference voltage and the switching voltage to output the adjustment signal to the first control circuit, wherein the power factor correction circuit is configured to selectively adjust an output voltage output to the resonance converter circuit according to a signal level of the adjustment signal.

3. The power converter device of claim 2, wherein when the switching voltage is greater than the reference voltage, the power factor correction circuit is configured to adjust the output voltage according to the adjustment signal.

4. The power converter device of claim 2, wherein when the switching voltage is less than the reference voltage, the power factor correction circuit is configured to maintain the output voltage according to the adjustment signal.

5. The power converter device of claim 1, wherein the primary side rectifier circuit comprises a primary rectifier unit and a low frequency filter unit.

6. The power converter device of claim 1, wherein the secondary side rectifier circuit is electrically coupled to the resonance converter circuit, and comprises a secondary rectifier circuit and an output filter circuit, and the output filter circuit is electrically coupled to the resonance converter circuit.

7. The power converter device of claim 1, further comprising:

a main transformer, wherein a first terminal of the main transformer is electrically coupled to the resonance converter circuit, and a second terminal of the main transformer is electrically coupled to the secondary side rectifier circuit.

8. A driving method, comprising:

driving a power factor correction circuit to output an output voltage to a resonance converter circuit;

detecting, by a zero voltage switching circuit, a reference voltage and a switching voltage of the resonance converter circuit, wherein the resonance converter circuit at least comprises a switching switch, a switching capacitor and a resonance circuit, and the switching voltage corresponds to a terminal voltage of the switching switch;

comparing, by the zero voltage switching circuit, the reference voltage and the switching voltage;

outputting, by the zero voltage switching circuit, an adjustment signal to the power factor correction circuit, wherein a signal level of the adjustment signal is determined by a comparison result of the switch voltage and the reference voltage; and selectively increasing or maintaining, by the power factor correction circuit, the output voltage according to the adjustment signal.

9. The driving method of claim 8, wherein when the switching voltage is greater than the reference voltage, the power factor correction circuit adjusts the output voltage according to the adjustment signal.

10. The driving method of claim 9, wherein when the switching voltage is less than the reference voltage, the power factor correction circuit maintains the output voltage according to the adjustment signal.

11. The driving method of claim 8, wherein the resonance converter circuit comprises a resonance inductance and an excitation inductance, before the switching switch is turned on, a resonance current of the resonance converter circuit is configured to increase a discharge speed of the switching capacitor, and the resonance converter circuit performs a zero voltage switching.

12. The driving method of claim 11, wherein before the switching switch is turned on, the resonance current generated by the resonance inductance is greater than an excitation current generated by the excitation inductance to increase the discharge speed of the switching capacitor.

13. The driving method of claim 12, wherein the resonance converter circuit is electrically coupled to a main transformer, when the main transformer generates an output current, the zero voltage switching circuit detects the switching voltage, and the resonance current is greater than the excitation current generated by the excitation inductance when the output current becomes zero.

14. A power converter device, comprising:

a power factor correction circuit electrically coupled to a primary side rectifier circuit, wherein the power factor correction circuit comprises a first switching circuit, a first control circuit and a first output circuit;

a resonance converter circuit electrically coupled to the power factor correction circuit, comprising a second switching circuit and a second control circuit, wherein the second switching circuit is electrically coupled to the first output circuit, and the second control circuit is electrically coupled to a secondary side rectifier circuit; and a zero voltage switching circuit electrically coupled between the first control circuit and the second control circuit, wherein the zero voltage switching circuit is configured to detect a cross voltage between two terminals of a switching switch in the second switching circuit, and is configured to output an adjustment signal to the first control circuit according to the cross voltage.

15. The power converter device of claim 14, wherein when the cross voltage is greater than a reference value, the power factor correction circuit is configured to adjust an output voltage according to the adjustment signal.

16. The power converter device of claim 15, wherein when the cross voltage is less than the reference value, the power factor correction circuit is configured to maintain the output voltage according to the adjustment signal.

17. The power converter device of claim 14, wherein the second switching circuit comprises:
- a switching switch electrically coupled to the first output circuit; and
- a switching capacitor electrically coupled to the switching switch, wherein before the switching switch is turned on, a resonance current of the resonance converter circuit is configured to increase a discharge speed of the switching capacitor, and the second switching circuit performs a zero voltage switching.

* * * * *